(12) United States Patent
Romandy

(10) Patent No.: US 8,381,942 B2
(45) Date of Patent: Feb. 26, 2013

(54) LID HOLDER FOR COOKING VESSEL

(75) Inventor: Mark K. Romandy, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 939 days.

(21) Appl. No.: 12/048,811

(22) Filed: Mar. 14, 2008

(65) Prior Publication Data
US 2009/0230134 A1 Sep. 17, 2009

(51) Int. Cl.
B65D 25/00 (2006.01)
(52) U.S. Cl. ...... 220/744; 220/379; 220/912; 220/573.1
(58) Field of Classification Search .............. 220/756, 220/832, 744, 573.1, 379, 912, 573, 763, 220/765, 720; 219/429, 432, 433; 248/37.3, 248/205.1, 213.2, 302, 303; 70/14, 81; 411/349, 411/549, 552; 211/85.4, 70.7, 429, 432, 211/433; 99/340
See application file for complete search history.

(56) References Cited

U.S. PATENT DOCUMENTS

| | | | |
|---|---|---|---|
| 576,887 A | 2/1897 | Pratt | |
| 1,155,261 A | 9/1915 | Mitchell | |
| 1,263,892 A | 4/1918 | Holdsworth | |
| 1,298,212 A * | 3/1919 | Holdsworth | 215/235 |
| 1,334,908 A | 3/1920 | Kinzel | |
| 1,390,766 A | 9/1921 | Cunningham | |
| 1,476,966 A | 12/1923 | Hachmann | |
| 1,732,988 A * | 10/1929 | Ruhmann | 220/813 |
| 1,745,548 A | 2/1930 | Lerner | |
| 1,836,014 A | 12/1931 | Chamberlain | |
| 1,926,219 A * | 9/1933 | Voss | 220/379 |
| 1,928,995 A | 10/1933 | De Biasi | |
| 2,098,858 A * | 11/1937 | Busson et al. | 220/322 |
| 2,315,089 A | 3/1943 | Dohrmann | |
| 2,373,722 A * | 4/1945 | Von Opel | 220/243 |
| 2,541,604 A | 2/1951 | Normandin | |
| 2,705,657 A * | 4/1955 | Di Giorgio | 220/744 |
| 3,081,395 A | 3/1963 | Wickenberg | |
| 3,163,385 A | 12/1964 | Lazan, Jr. | |
| 3,384,385 A * | 5/1968 | Cohen et al. | 280/79.2 |
| 3,635,371 A | 1/1972 | Oxel | |
| 3,850,331 A | 11/1974 | Oxel | |
| 4,206,853 A | 6/1980 | Iten et al. | |
| 4,375,711 A | 3/1983 | Franzen et al. | |
| 4,635,613 A | 1/1987 | Tucker et al. | |

(Continued)

OTHER PUBLICATIONS

Office Action issued Nov. 18, 2011 in U.S. Appl. No. 12/502,734.

*Primary Examiner* — Mickey Yu
*Assistant Examiner* — Chun Cheung
(74) *Attorney, Agent, or Firm* — Alexander D. Raring

(57) ABSTRACT

A cooking vessel for cooking foodstuff includes a base that has an outer sidewall, a generally hollow interior and a generally open top. A lid is removably mounted to the base and complementarily covers the open top of the base in a first position. The lid includes a handle that extends outwardly from the lid away from the base in the first position. A lid holder is rotatably mounted to the outer sidewall of the base. The lid holder engages with the handle to support the lid in a second position. The open top of the base at least partially exposes the hollow interior when the lid is in the second position. The lid holder is rotatable between a support position and a storage position. The lid holder extends partially above the open top of the base in the support position and is entirely below the open top in the storage position.

18 Claims, 5 Drawing Sheets

U.S. PATENT DOCUMENTS

| | | |
|---|---|---|
| 4,957,039 A | 9/1990 | Reyes |
| 5,073,993 A | 12/1991 | Dewaal |
| 5,507,220 A | 4/1996 | Jung |
| 5,683,010 A | 11/1997 | Boyajian, Jr. |
| 5,823,385 A * | 10/1998 | Cautereels .......... 220/762 |
| 5,887,751 A | 3/1999 | Kroscher |
| 5,941,411 A | 8/1999 | Langenbach |
| 6,105,810 A | 8/2000 | Daenen et al. |
| 6,220,477 B1 | 4/2001 | Schneider |
| 6,234,067 B1 | 5/2001 | Schmidt |
| RE37,518 E | 1/2002 | Hardigg et al. |
| 6,763,965 B2 | 7/2004 | Parenteau |
| 7,025,312 B1 | 4/2006 | Dare |
| 7,090,094 B2 | 8/2006 | Wade et al. |
| 7,694,844 B2 | 4/2010 | Woo |
| 2006/0174776 A1 | 8/2006 | Fissler |
| 2006/0237468 A1 | 10/2006 | Dukes |
| 2007/0210061 A1 | 9/2007 | Tynes et al. |
| 2009/0272749 A1 | 11/2009 | Romandy et al. |

* cited by examiner

LID HOLDER FOR COOKING VESSEL

BACKGROUND OF THE INVENTION

This invention generally relates to lid holder for a cooking vessel and, more particularly, to a lid holder that is rotatably attached to an outer sidewall of a cooking vessel and engages with a lid handle to hold the lid in a generally vertical position.

Cooking vessels, such as pots, pans and slow cookers, often have a removable lid to prevent excessive evaporation and heat loss during cooking and between servings. There is often a need to intermittently remove, hold or store the hot lid while performing various activities required during cooking or serving. Because of the constrained confines and clutter of most kitchens and the short time period needed for accessing the contents of the cooking vessel, it is desirable to keep the lid close to the cooking vessel while accessing the contents of the cooking vessel. Additionally, the condensation and/or foodstuff left on the inner surface of the lid may drip from the lid and fall on nearby surfaces creating a mess and/or damaging certain surfaces such as wooden tables. Lid holders for holding the lid proximate the cooking vessel are known such as disclosed in U.S. Pat. Nos. 1,745,548 and 5,683,010. However, known lid holders do not position the lid such that the moisture on the interior lid surface drips back into the cooking vessel. Additionally, known lid holders are either positioned on the rim or the handles of the cooking vessel thereby hindering normal use of the cooking vessel.

What is therefore needed, but not provided in the prior art, is a lid holder that is mounted on the outer sidewall of the cooking vessel and engages with the lid handle to direct the moisture draining from the lid back into the cooking vessel and leaves the rim and handles of the cooking vessel unobstructed. Additionally, it is desirable to provide a lid holder that is rotatable from a lid support position to a storage position.

BRIEF SUMMARY OF THE INVENTION

Briefly stated, the present invention is directed to a cooking vessel for cooking foodstuff. The cooking vessel includes a base that has an outer sidewall, a generally hollow interior and a generally open top. A lid is removably mounted to the base and complementarily covering the open top of the base in a first position. The lid includes a handle that extends outwardly from the lid away from the base in the first position. A lid holder is mounted to the outer sidewall of the base. The lid holder engages with the handle to support the lid in a second position. The open top of the base at least partially exposing the hollow interior of the base when the lid is in the second position. The lid holder being angled at a support end to tilt an upper end of the lid away from the base when the lid is in the second position. A lower portion of the lid rests proximate a periphery of the open top of the base to allow liquid to drain from an interior surface of the lid and into the interior of the base when the lid is in the second position.

In another aspect, the invention is directed to a cooking vessel for cooking foodstuff. The cooking vessel includes a base that has an outer sidewall, a generally hollow interior and a generally open top. A lid is removably mounted to the base and complementarily covers the open top of the base in a first position. A lid holder is rotatably mounted to the outer sidewall of the base. The lid holder supports the lid in a second position. The open top of the base at least partially exposing the hollow interior when the lid is in the second position. The lid holder rotatable between a support position and a storage position.

In another aspect, the invention is directed to a cooking vessel for cooking foodstuff. The cooking vessel includes a base that has an outer sidewall, a generally hollow interior and a generally open top. A lid is removably mounted to the base and complementarily covers the open top of the base in a first position. The lid includes a handle that extends outwardly from the lid away from the base in the first position. A lid holder is rotatably mounted to the outer sidewall of the base. The lid holder engages with the handle to support the lid in a second position. The open top of the base at least partially exposes the hollow interior when the lid is in the second position. The lid holder is rotatable between a support position and a storage position. The lid holder extends partially above the open top of the base in the support position and is below the open top in the storage position.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
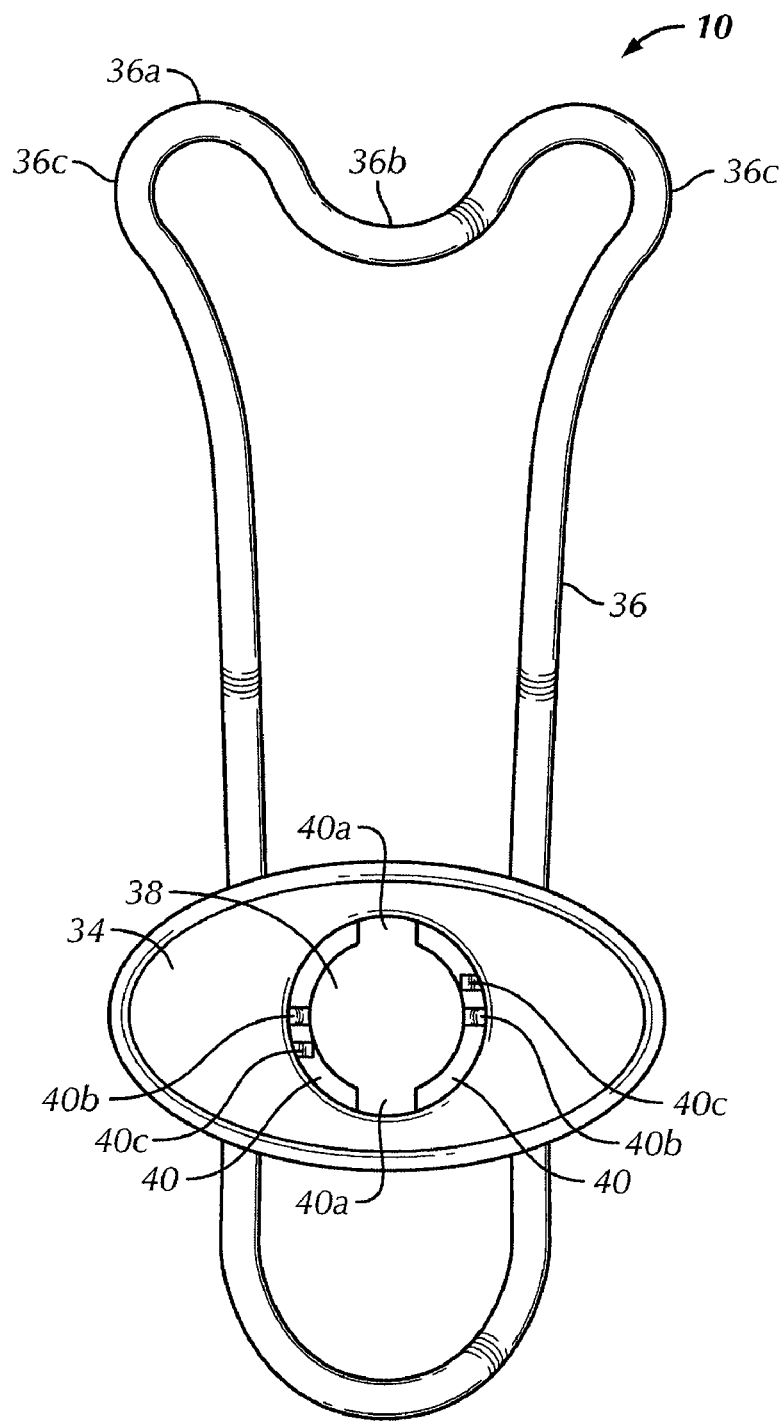
FIG. 1 is a front elevational view of a lid holder in accordance with a preferred embodiment of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of a lid holder in accordance with the present invention, and designated parts thereof. Unless specifically set forth herein, the terms "a", "an" and "the" are not limited to one element but instead should be read as meaning "at least one". The terminology includes the words noted above, derivatives thereof and words of similar import.

Referring to the drawings in detail, wherein like reference numerals indicate like elements throughout, there is shown in FIGS. 1-5, a preferred embodiment of a lid holder, generally designated 10, in accordance with the present invention.

Figure 2:
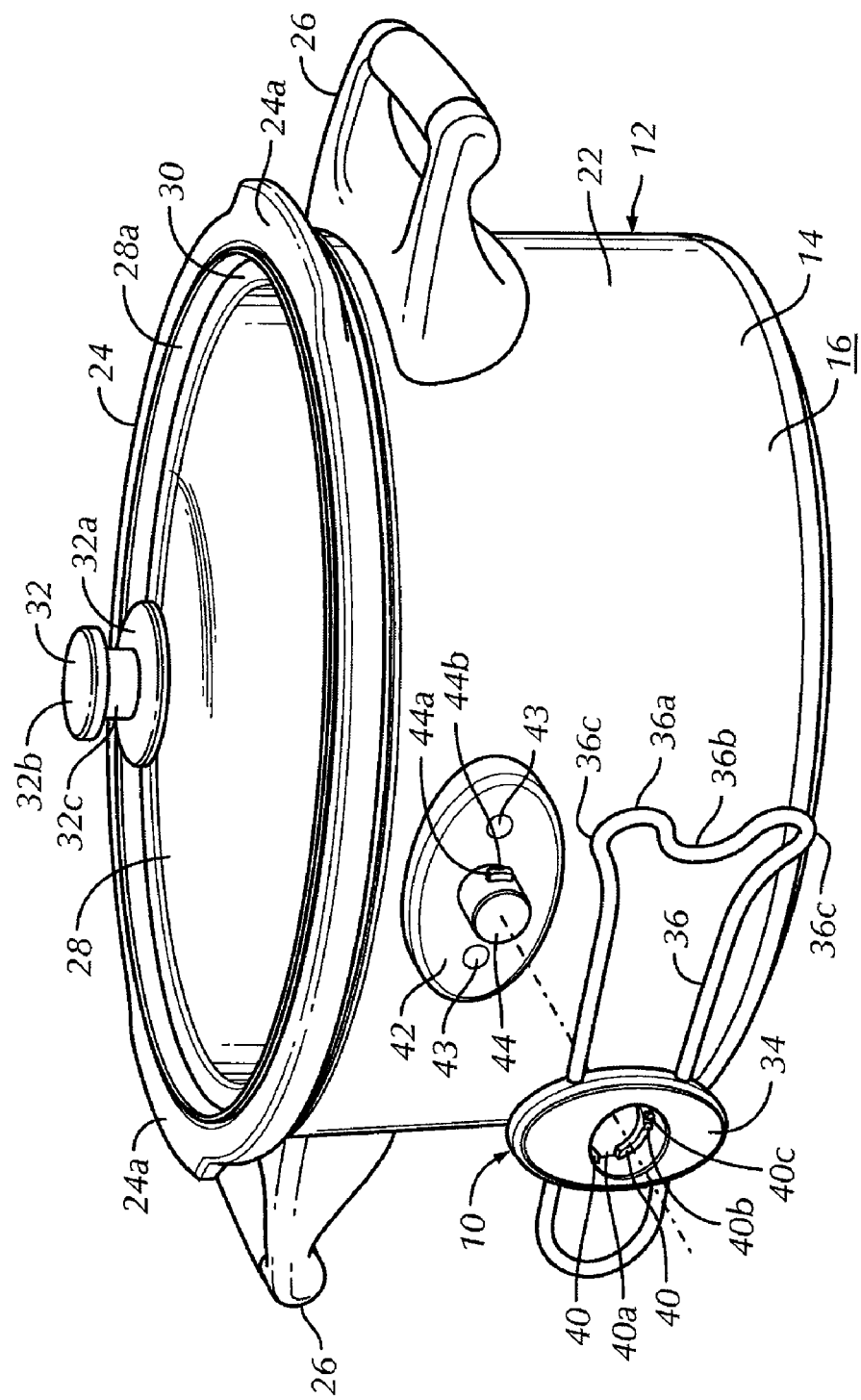
FIG. 2 is a perspective view of the lid holder of FIG. 1 shown separated from a cooking vessel.
Figure 3:
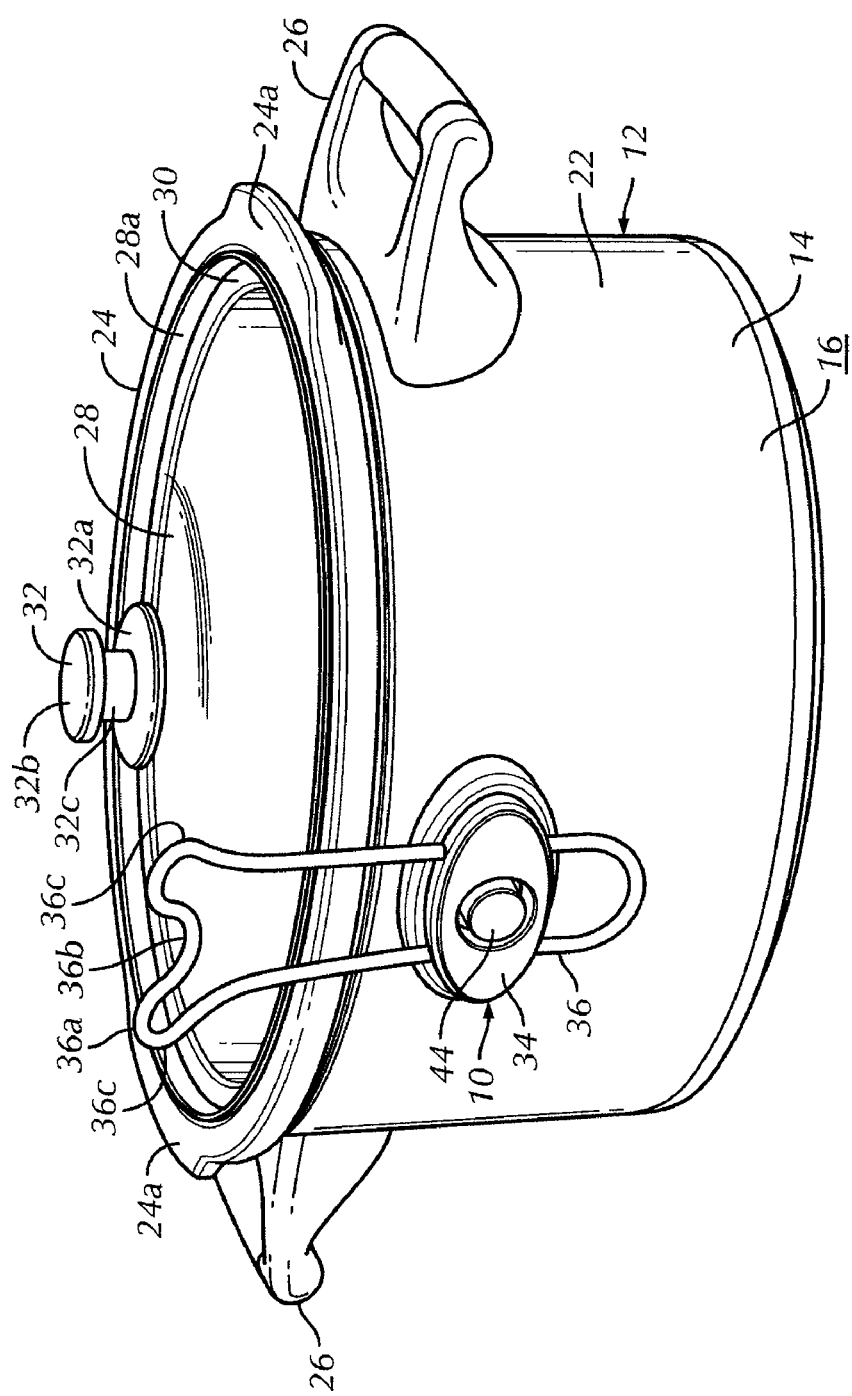
FIG. 3 is a perspective view of the lid holder of FIG. 1 shown mounted to a cooking vessel in a support position with a lid of the cooking vessel in a first position.
Figure 4:
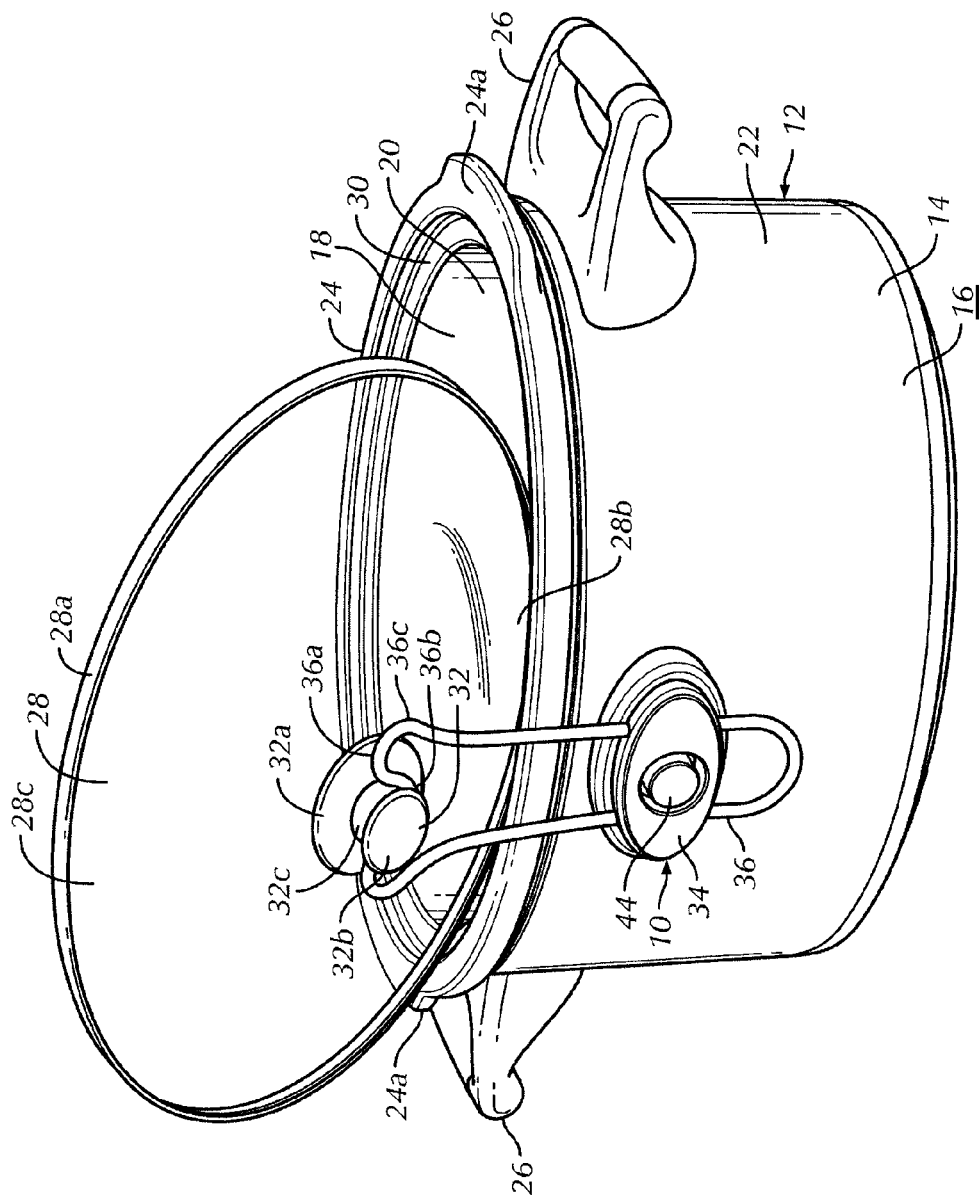
FIG. 4 is a perspective view of the lid holder and cooking vessel shown in FIG. 3 with the lid in a second position.
Figure 5:
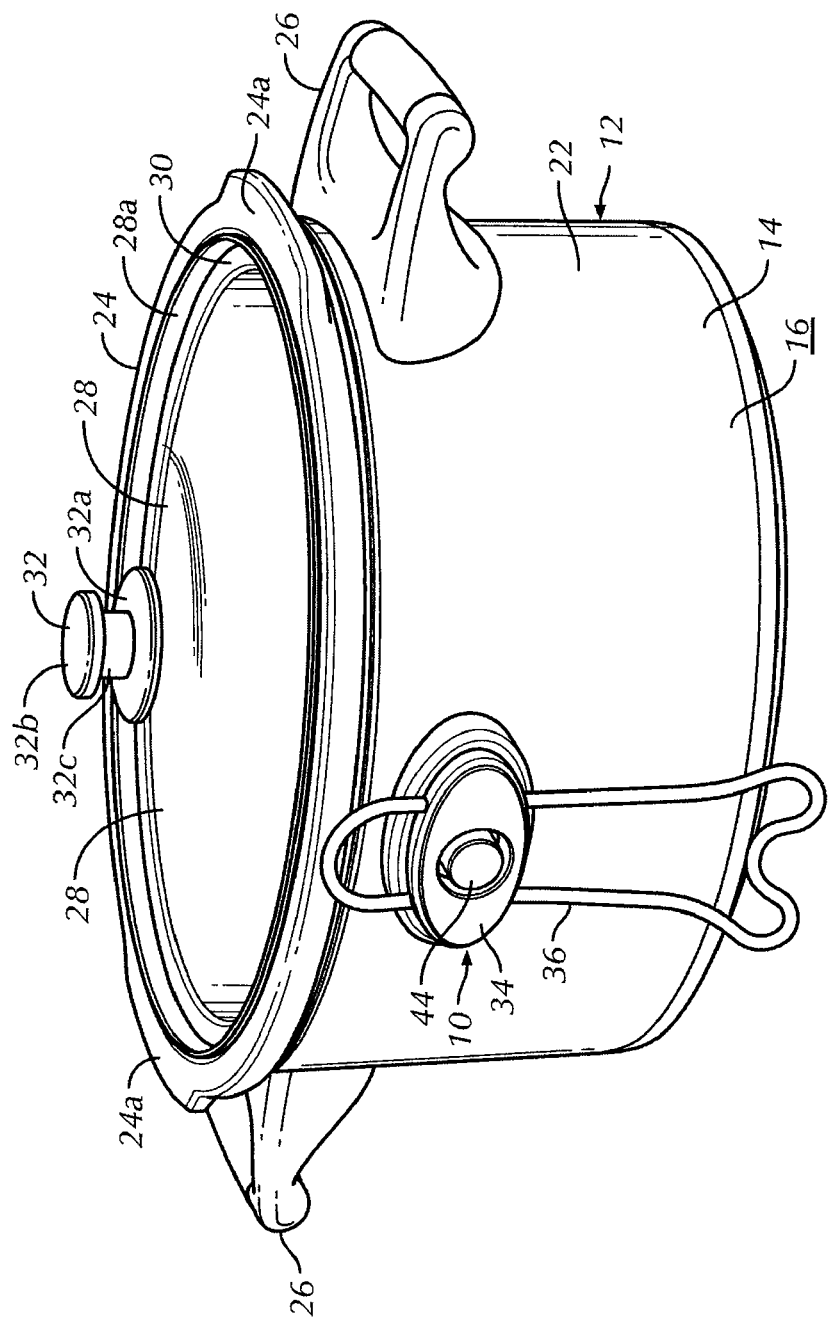
FIG. 5 is a perspective view of the lid holder and cooking vessel shown in FIG. 3 with the lid holder in a storage position.

Referring to FIGS. 2-5, the lid holder 10 is for use with a cooking vessel, generally designated 12. The cooking vessel 12 includes a base 14 that has an outer sidewall 16, a generally hollow interior 18 and a generally open top 20 (see FIG. 4). The cooking vessel 12 includes a removably mountable lid 28. The lid 28 is removably mounted to the base 14 and complementarily covers the open top 20 of the base 14 in a closed or first position (FIGS. 2, 3 and 5). The base 20 preferably includes a rim 30 that is indented to receive an outer periphery 28a of the lid 28. The lid 28 includes a handle 32 that is positioned in the approximate center of the lid 28 and extends outwardly or upwardly from the base 14 when the lid 28 is in the first position. The lid 28 preferably includes a lid mount 32a attached to the lid 28, a lid knob 32b and a lid handle body 32c extending between the lid mount 32a and the lid knob 32b. The lid knob 32b is preferably larger in diameter than the lid handle body 32c to aid in gripping the lid knob 32b and for engaging with the lid holder 10 as described in further detail below. The lid handle 32 may be removably or permanently mounted to the lid 28 or the lid handle 32 may be integrally formed with the lid 28. The lid 28 includes an interior surface (not shown) that opposes the handle 32 and faces the interior 18 of the base 14 when the lid 28 is in the first position.

The cooking vessel 12 is preferably in the form of a slow cooker of the type known in the art comprised of an outer heating unit 22 and a removable pot 24 that is disposed substantially within the heating unit 22 in an assembled position (shown in FIGS. 2-5). The heating unit 22 preferably includes a pair of heating unit handles 26 and houses a heating element (not shown). The heating element warms the removable pot 24 and cooks foodstuff (not shown) positioned within the hollow interior 18. The removable pot 24 preferably includes a pair of opposed pot handles 24a for removing the removable pot 24 from the heating unit 22. Slow cookers are well known in the art and further detail of the cooking vessel 12 is omitted for brevity only and is not limiting. Though it is preferred that the cooking vessel 12 be a slow cooker, the cooking vessel 12 may be any cooking vessel, pan or pot known in the art for cooking and warming foodstuff.

Referring to FIG. 1, the lid holder 10 is comprised of a hub 34 and a support 36. The support 36 is preferably fixedly attached to the hub 34 though the support 36 may be movably or releasable mounted to the hub 34. The hub 34 and support 36 may also be integrally formed. The hub 34 is preferably molded from a polymeric material though the hub 34 may be comprised of any suitable material. The support 36 is preferably comprised of a closed loop metallic wire frame formed from a rod having a circular cross section that forms an outlined or framed Y-shape. However, the support 36 may be comprised of any material such as a polymeric material, have any shape such as oval or rectangular and be comprised of a solid piece. The support 36 preferably includes a support end 36a that has an indent 36b that extends inwardly or downwardly toward the hub 34. The support end 36a may also extend outwardly on either lateral side of the indent 36b to form sides 36c that widen the support 36 and better support the lid 28. The support end 36a is preferably angled away from the cooking vessel 12 (see FIG. 3). The hub 34 preferably includes a central opening 38 that extends entirely through the hub 34 though the opening 38 may extend only partially into the hub 34. The hub 34 also preferably includes a retaining flange 40 that extends partially across the opening 38 and is recessed or discontinuous at one or more recesses 40a. Preferably, the retaining flange 40 includes a pair of recesses 40a that are generally opposed from each other. The retaining flange 40 also preferably includes at least one projection 40b and at least one stop 40c that each extend from the retaining flange 40, away from the base 12, and are positioned 90 degrees from the recesses 40a. The stops 40c are preferably positioned on alternate sides of the projections 40b.

Referring to FIG. 2, the lid holder 10 is mounted to the outer sidewall 16 of the base 14 on a side of the base 14 generally opposed from a control knob (not shown) for controlling the operating temperature of the cooking vessel 12. The lid holder 10 is preferably removably mounted to the outer sidewall 16 in a mounting position as shown. A mounting support 42 is preferably provided between the lid holder 10 and the base 14 such that the mounting support 42 is attached to the outer sidewall 16 of the base 14 below the rim 30, though the hub 34 may be directly in contact with the outer sidewall 16. The mounting support 42 may be considered to be integral with the outer sidewall 16 for purposes of discussing the relationship between the lid holder 10 and the outer sidewall. The hub 34 is preferably spaced from the mounting support 42 by a washer or ring (not shown) extending from the hub 34 or the mounting support 42 such that the hub 34 does not fully contact the mounting support 42. A spaced relationship between the hub 34 and the mounting support 42 prevents mounting instructions or a graphic (not shown) printed or otherwise provided on the mounting support 42 from being rubbed or otherwise damaged by the rotating hub 34. The mounting support 42 is preferably fixedly attached to the base 14 with a pair of fasteners 43 though the mounting support 42 may be releasably mounted or integrally formed with the base 14. The fasteners 43 may also extend from the base 14 and into the mounting support 42 such that the fasteners 43 are not visible. The mounting support 42 includes an axle 44 extending outwardly from the base 14 and extends at least partially through the hub 34 when the lid holder 10 is mounted on the mounting support 42. The axle 44 is preferably cylindrical in cross section such that the axle 44 has a cylindrical sidewall and a flat exposed wall extending parallel to a plane defined by the outer sidewall 16 of the base 14 at a point of attachment between the lid holder 10 and the base 14 (see FIG. 2). Thus, the hub 34 is rotatable about the axle 44 when the lid holder 10 is mounted on the mounting support 42. As shown in FIGS. 3-5, the flat exposed wall of the axle 44 and an exterior surface of the hub 34 are preferably generally coplanar when the lid holder 10 is in a support position, as described in detail below. However, the axle 44 may have any suitable shape such as rectangular such that the lid holder 10 is removably mounted in a plurality of positions rather than being rotatable with respect to the axle 44. The axle 44 preferably includes at least one and preferably two opposed alignment tabs 44a (one alignment tab obstructed from view). When the lid holder 10 is mounted to the cooking vessel 12, the recesses 40a in the retaining flange 40 are aligned with the alignment tabs 44a and the alignment tabs 44a pass through the flange 40. The lid holder 10 may be mounted to or removed from the mounting support 44 in the position shown in FIG. 2, or a mirror image of the lid holder 10 with respect to the cooking vessel 12. The lid holder 10 is retained on the mounting support 42 and correspondingly the base 14 when the alignment tabs 44a extend through the flange 40 and the lid holder 10 is rotated in either direction. The alignment tabs 44a extend outwardly from the axle 44 and engage with the retaining flange 40 on the hub 34 when the lid holder 10 is mounted to the cooking vessel 12 such that the retaining flange 40 is sandwiched between the alignment tabs 44a and the mounting support 42.

Referring to FIGS. 2-5, the lid holder 10 is rotatable between a support position (FIGS. 3 and 4) and a storage position (FIG. 5). The lid holder 10 is preferably removable from the base 14 when the lid holder 10 is rotated about one half turn between the support and storage positions into the mounting position (FIG. 2) to remove the lid holder 10 for cleaning, aesthetic concerns or any other desired purpose. More specifically, the lid holder 10 is preferably rotatable about an axis, which is generally defined by the axle 44, extending perpendicularly to a plane defined by the outer sidewall 16 of the base 14 at a point of attachment between the lid holder 10 and the base 14. The lid holder 10 may also be snap fit onto the base 14 or be removably or fixedly attached to the outer sidewall 16 of the base 14 in any suitable manner. When the lid holder 10 is in the support position, the support end 36a preferably extends above the open top 20 and the support end 36a extends entirely below the open top 20 in the storage position (FIG. 5).

With the lid holder 10 in the support position, the lid holder 10 engages with the lid handle 32 to support the lid 28 in a second position (FIG. 4). The open top 20 of the base 14 at least partially exposes the hollow interior 18 of the base 14 when the lid 28 is in the second position. When the lid holder 10 is placed in the support position, the user removers the lid 28 from the cooking vessel 12 and pivots the lid 28 to a generally vertical position. The lid handle 32 is then placed within the indent 36b in the support end 36a of the lid holder 10 such that the lid handle body 36 rests within the indent 36b in the second position. The angle of the support end 36a of the lid holder 10 tilts the upper end 28c of the lid 28 away from the base 14 and a lower portion of the lid 28b opposed from the upper end 28c preferably rests on the rim 30, proximate the rim 30 or proximate or on an inner periphery of the base 14. Resting the lid 28 on both the rim 30 and the lid holder 10 helps to shift the weight of the lid 28 to the lid holder 10, prevents the lid 28 from moving and directs any condensation or foodstuff on the inner surface of the lid down into the interior 18 of the base 14 when the lid 28 is in the second position. When the user is done accessing the contents of the cooking vessel 12 or otherwise desires to replace the lid 28, the user grasps the lid 28 by the lid handle 32 and places the lid 28 back on the cooking vessel 12 in the first position (FIG. 3).

Referring to FIGS. 2 and 5, once the lid holder 10 is mounted to the base 14, the lid holder 14 may be rotated approximately 90 degrees between the mounting position and the storage position. The lid holder 10 may then be rotated 90 degrees in the opposite direction and then removed from the base 14. To install the lid holder 10 in the support position, the lid holder 10 is rotated 180 degrees from the position shown in FIG. 2, mounted to the base 14 and then rotated 90 degrees to the support position.

The alignment tabs 44a on the axle 44 preferably include a groove 44b that engages with one of the projections 40b on the hub 34 to snap-fit the lid holder 10 in either the storage or support position such that a predetermined amount of force is required to disengage the projections 40b from the alignment tabs 44a. The stops 40c on the hub 34 prevent the lid holder 10 from being rotated in one direction out of the storage or support positions. For example, when the lid holder 10 is mounted to the cooking vessel 12 in the mounting position (FIG. 2) the lid holder 10 is then rotated 90 degrees to the storage position (FIG. 5). The stops 40c prevent further rotation of the lid holder 10 in the same direction. Alternatively, the user may mount the lid holder 10 to the cooking vessel 12 in a mounting position that is rotated or flipped 180 degrees (not shown) from the mounting position shown in FIG. 2, mount the lid holder to the cooking vessel 12 and then rotate the lid holder 10 90 degrees to the support position (FIGS. 3 and 4). The stops 40c prevent the lid holder 10 from being rotated further in the same direction. The stops 40c allow for the lid holder 10 to be quickly rotated into position without a concern for over rotation. The stops 40c are configured such that the lid holder 10 is rotated 90 degrees clockwise with respect to the user's point of view into either the support or storage position, depending on the mounting position, and then must be rotated 90 degrees counterclockwise with respect to the user's point of view to remove the lid holder 10. The mounting configurations are consistent with the general notion for opening and closing items that a clockwise twist, or right turn is associated with tightening and a counterclockwise twist, or left turn is associated with loosening. Here, the tightening motion corresponding to movement into the storage or support positions and loosening motion corresponding to movement into the mounting position for removing the lid holder 10 from the base 14. The support position and the storage position are preferably 180 degrees apart and require removing the lid holder 10 from the base and remounting in a different position between switching between the support position and the storage position. However, storage position is preferably any position that places the support end 36a below the open top 20 such that the lid holder 10 does not extend above the cooking vessel 12 and the lid holder 10 may be rotated between the support and storage positions without removing the lid holder 10 from the cooking vessel 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A cooking vessel for cooking foodstuff comprising:
    a base having an outer sidewall, a generally hollow interior and a rim surrounding a generally open top;
    a lid removably mounted to the base and complementarily covering the open top of the base in a first position, the lid including an outer periphery and a handle extending outwardly from the lid away from the base in the first position;
    a mounting support attached to the outer sidewall of the base below the rim thereof;
    a lid holder comprising a hub and a support, the hub and support of the lid holder rotatably mountable to the mounting support, the lid holder thereby moveable between a support position and a storage position, the lid holder when in the support position engaging with the handle to support the lid in a second position, the open top of the base at least partially exposing the hollow interior of the base when the lid is in the second position, the lid holder being angled at a support end to tilt an upper end of the lid away from the base when the lid is in the second position and a lower portion of the outer periphery of the lid resting on the rim of the base to allow liquid to drain from an interior surface of the lid and into the interior of the base when the lid is in the second position; and
    wherein the mounting support includes an axle extending perpendicularly therefrom, the axle having a cylindrical sidewall and a flat exposed wall extending parallel to a plane defined by the outer sidewall of the base at a point of attachment between the lid holder and the base, the lid holder support and lid holder hub being rotatably mountable to the axle of the mounting support.

2. The cooking vessel of claim 1, wherein the support forms an outlined Y-shape and includes an indent in a support end and the handle rests within the indent in the second position.

3. The cooking vessel of claim 1, wherein the support comprises a wire frame extending from the hub.

4. The cooking vessel of claim 1, wherein the base is comprised of an outer heating unit and removable pot that is disposed substantially within the heating unit in an assembled position.

5. The cooking vessel of claim 1, wherein the flat exposed wall of the axle and an exterior surface of the hub are generally coplanar when lid holder is in the support position.

6. A slow cooker for cooking foodstuff comprising:
a base having a heating unit with an outer sidewall, a generally hollow interior, a generally open top, the base further including a removable pot being disposed within the generally hollow interior, the pot having a rim extending around the generally open top;
a lid removable mounted to the base and complementarily covering the open top of the base in a first position, the lid including an outer periphery and a handle extending outwardly from the lid away from the base in the first position;
a mounting support attached to the outer sidewall of the base below the rim of the removable pot; and
a lid holder comprising a hub and a support, the hub and support of the lid holder rotatably mounted to the outer sidewall of the base and operable to rotate the lid holder between a storage position and a support position, the lid holder when in the support position engaging with the handle to support the lid in a second position such that the outer periphery of the lid rests on the rim of the removable pot, the open top of the base at least partially exposing the hollow interior when the lid is in the second position, the lid holder being angled at a support end to tilt an upper end of the lid away from the base when the lid is in the second position,
wherein the lid holder support and lid holder hub are rotatable about an axis extending perpendicularly to a plane defined by the outer sidewall of the base at a point of attachment between the lid holder and the base.

7. The slow cooker of claim 6, wherein the lid holder is removable from the base.

8. The slow cooker of claim 6, wherein the lid holder extends partially above the open top of the base in the support position and is entirely below the open top in the storage position.

9. The slow cooker of claim 8, wherein the lid holder is removable from the base and remountable onto the base before rotating the lid holder between the support position and the storage position.

10. The slow cooker of claim 8, wherein a mounting support is positioned between the lid holder and the base.

11. The slow cooker of claim 10, wherein the mounting support includes an axle that extends through the hub of the lid holder.

12. The slow cooker of claim 11, wherein the axle includes at least one alignment tab that engages with at least one retaining flange on the rotatable hub to prevent the lid holder from being removed in the support and storage positions.

13. The slow cooker of claim 12, wherein the at least one retaining flange is discontinuous around the inner periphery of the hub and the at least one alignment tab is positioned along the axle such that the lid holder is removable from the mounting support when the lid holder is rotated between the support position and the storage position.

14. The slow cooker of claim 12, wherein the at least one retaining flange includes a projection that releasably engages with the at least one retaining flange in one of the support and storage positions such that a predetermined amount of force is required to disengage the at least one projection and the at least one alignment tab.

15. The slow cooker of claim 12, wherein the retaining flange includes at least one stop that engages with the alignment tab once the lid holder is rotated in a first direction into the support position and prevents the lid holder form being rotated in the first direction.

16. A cooking vessel for cooking foodstuff comprising:
a base having an outer sidewall, a generally hollow interior and a generally open top, the base having a rim extending inwardly therefrom around the periphery of the base;
a lid removably mounted to the base and complementarily covering the open top of the base in a first position, the lid including a handle extending outwardly from the lid away from the base in the first position;
a mounting support attached to the outer sidewall of the base below the rim thereof, the mounting support includes an axle extending perpendicularly therefrom, the axle having a cylindrical sidewall and a flat exposed wall extending parallel to a plane defined by the outer sidewall of the base at a point of attachment between the lid holder and the base; and
a lid holder rotatably mounted to the outer sidewall of the base, the lid holder engaging with the handle to support the lid in a second position and a portion of the lid resting on the rim in the second position, the open top of the base at least partially exposing the hollow interior when the lid is in the second position, the lid holder being rotatable between a support position and a storage position, the lid holder extending partially above the open top of the base in the support position and is entirely below the open top in the storage position.

17. The cooking vessel of claim 16, wherein the lid holder is removable form the base when the lid holder is rotated between the support and storage positions.

18. The cooking vessel of claim 16, wherein the lid includes an outer periphery, and wherein at least a portion of the outer periphery of the lid rests on the rim of the base to allow liquid to drain from an interior surface of the lid and into the interior of the base when the lid is in the second position.

* * * * *